(12) United States Patent
Sullivan et al.

(10) Patent No.: US 7,513,192 B2
(45) Date of Patent: Apr. 7, 2009

(54) BEVERAGE FORMING DEVICE WITH OPENING/CLOSING MECHANISM FOR A BEVERAGE CARTRIDGE RECEIVER

(75) Inventors: Kevin P. Sullivan, Wakefield, MA (US); Ian Tinkler, Wakefield, MA (US); Geoffrey Y. Smith, Melrose, MA (US); Darius Dilmaghani, Chelmsford, MA (US); Finn Brudevold, Wellesley, MA (US)

(73) Assignee: Keurig, Incorporated, Wakefield, MA (US)

( * ) Notice: Subject to any disclaimer, the term of this patent is extended or adjusted under 35 U.S.C. 154(b) by 316 days.

(21) Appl. No.: 11/387,156

(22) Filed: Mar. 23, 2006

(65) Prior Publication Data

US 2007/0221066 A1    Sep. 27, 2007

(51) Int. Cl.
*A47J 31/00* (2006.01)
*A23P 1/04* (2006.01)

(52) U.S. Cl. .......... 99/289 R; 99/279; 99/295; 99/450.1; 99/302 R; 99/302 P; 99/300

(58) Field of Classification Search ......... 99/279, 99/450.1, 295, 302 R, 289, 302 P, 300, 289 R
See application file for complete search history.

(56) References Cited

U.S. PATENT DOCUMENTS

| | | | |
|---|---|---|---|
| 3,007,392 | A | 11/1961 | Pecoraro et al. |
| 4,581,239 | A | 4/1986 | Woolman et al. |
| 4,644,855 | A | 2/1987 | Woolman et al. |
| 4,738,378 | A | 4/1988 | Oakley et al. |
| 5,272,960 | A | 12/1993 | Kinna |
| 5,649,472 | A | 7/1997 | Fond et al. |
| 5,794,519 | A | 8/1998 | Fischer |
| 6,009,792 | A | 1/2000 | Kraan |
| 6,047,630 | A | 4/2000 | Brown et al. |
| 6,050,175 | A | 4/2000 | Mirand et al. |
| 6,490,966 | B2 | 12/2002 | Mariller et al. |

(Continued)

FOREIGN PATENT DOCUMENTS

EP    0151252    8/1985

(Continued)

OTHER PUBLICATIONS

International Search Report and Written Opinion for International Application No. PCT/US2007/006914, dated Nov. 7, 2007.

(Continued)

*Primary Examiner*—Shawntina Fuqua
(74) *Attorney, Agent, or Firm*—Wolf, Greenfield & Sacks, P.C.

(57) ABSTRACT

A beverage forming system includes an actuator and first and second portions that are movable relative to each other between open and closed positions. The first and second portions include a cartridge receiving portion to accept a cartridge for forming a beverage, e.g., a disposable single serve cartridge. A first linkage member may be fixed to the actuator and physically contact a second linkage member that may be fixed to the first or second portion (or to a frame that supports the first and second portions). Movement of the actuator may cause movement of the first and second linkage members relative to each other, thereby causing relative movement of the first and second portions between open and closed positions.

34 Claims, 6 Drawing Sheets

U.S. PATENT DOCUMENTS

| | | |
|---|---|---|
| 6,584,888 B2 | 7/2003 | Cortese |
| 6,655,260 B2 | 12/2003 | Lazaris et al. |
| 6,698,332 B2 * | 3/2004 | Kollep et al. ............... 99/289 R |
| 6,725,762 B2 | 4/2004 | Kollep et al. |
| 6,748,850 B1 | 6/2004 | Kraan |
| 6,763,759 B2 | 7/2004 | Denisart |
| 6,799,503 B2 | 10/2004 | Kollep et al. |
| 6,857,352 B2 | 2/2005 | Fischer |
| 6,857,353 B2 * | 2/2005 | Kollep et al. ............... 99/289 R |
| 6,904,840 B1 | 6/2005 | Pfeifer et al. |
| 2002/0002913 A1 | 1/2002 | Mariller et al. |
| 2002/0124736 A1 | 9/2002 | Kollep et al. |
| 2004/0182248 A1 | 9/2004 | Fischer |
| 2005/0106288 A1 | 5/2005 | Blanc et al. |
| 2005/0132891 A1 | 6/2005 | Chen et al. |
| 2005/0235834 A1 | 10/2005 | Blanc et al. |

FOREIGN PATENT DOCUMENTS

| | | |
|---|---|---|
| EP | 0870457 A1 | 10/1998 |
| EP | 1559351 | 8/2005 |
| EP | 1688072 | 8/2006 |
| WO | WO-94/02059 | 2/1994 |
| WO | WO-9608990 | 3/1996 |
| WO | WO-98/20782 | 5/1998 |
| WO | WO-01/30218 A1 | 5/2001 |

OTHER PUBLICATIONS

International Preliminary Report on Patentability from the International Preliminary Examining Authority, International Application No. PCT/US2004/040632, dated Mar. 22, 2006.

* cited by examiner

BEVERAGE FORMING DEVICE WITH OPENING/CLOSING MECHANISM FOR A BEVERAGE CARTRIDGE RECEIVER

BACKGROUND OF INVENTION

1. Field of Invention

This invention relates to beverage forming systems, such as single-serve coffee brewers that use a disposable beverage cartridge.

2. Related Art

Beverage forming systems that use a disposable beverage cartridge for forming a beverage are well known. For example, U.S. Pat. No. 6,698,332 discloses a device for extracting a substance for preparing a drink such as individual cups of coffee. The device includes first and second support members that are pivotally connected together at a support pivot axis. An operation lever is pivotally connected to the second support member and pivotally connected to a first end of a traction arm at a connection pivot axis. A second end of the traction arm is pivotally connected to the first support member. Accordingly, upon rotation of the lever about the lever pivot axis, the lever and traction arm cooperate to move the first and second support members between open and closed positions.

SUMMARY OF INVENTION

In one aspect of the invention, a mechanism is provided to move first and second portions of a beverage forming system. The first and second portions may include a cartridge receiving portion, e.g., to receive a disposable beverage cartridge used in forming a tea, coffee or other beverage. Using the mechanism, the first and second portions may be moved to an open position in which the beverage cartridge may be placed in the cartridge receiving portion, and subsequently closed in preparation for forming a beverage. In accordance with one aspect of the invention, the mechanism used to move the first and second portions between open and closed positions may include first and second linkage members, such as a cam and cam follower. Movement of a handle or other actuator may cause relative movement of the first and second linkage members, thereby causing the first and second portions to move between the open and closed positions. In some embodiments, the first and second linkage members may be fixed to the handle and frame, respectively, and form a relatively simple arrangement for causing movement of the first and second portions. For example, by reducing the number of different parts needed to control movement of the first and second portions, benefits may be realized in simpler manufacturing, reduced costs, fewer parts for assembly and/or others. For example, the first and second linkage members in one illustrative embodiment may be respectively formed integrally with a handle and a frame of the system, thereby eliminating any need for additional parts in the mechanism used to open and close the first and second portions.

In another aspect of the invention, a beverage forming system includes first and second portions that define a cartridge receiving portion. At least one of the first and second portions is movable between an open position, in which a beverage cartridge is positionable in the cartridge receiving portion, and a closed position in which the first and second portions cooperate to at least partially enclose the beverage cartridge. An actuator may be movable between first and second positions, and a frame may support the first and second portions. First and second linkage members may contact each other, with the first linkage member being fixed relative to the actuator so that movement of the actuator causes movement of the first linkage member relative to the second linkage member. The second linkage member may be fixed relative to the frame, the first portion or the second portion. As a result, movement of the actuator and the first linkage member relative to the second linkage member may cause movement of the first and second portions relative to each other between the open and closed positions. Movement of the first and second portions relative to each other may involve movement of the first portion only, movement of the second portion only and/or movement of both the first and second portions.

In another aspect of the invention, a beverage forming system may include a first portion including a lid portion, and a second portion including a cartridge receiving portion. At least one of the first and second portions may be movable between an open position, in which a beverage cartridge is positionable in the cartridge receiving portion, and a closed position in which the lid and cartridge receiving portion cooperate to at least partially enclose the beverage cartridge. A handle may be movable between first and second positions, and a frame (if provided) may support the first and second portions. A cam and cam follower may also be provided, with one of the cam and cam follower being fixed to the handle so that movement of the handle causes movement of the cam relative to the cam follower. The other of the cam and cam follower may be linked to the frame, the first portion or the second portion so that movement of the cam relative to the cam follower causes movement of the first and second portions relative to each other. As a result, movement of the handle may cause the cam and cam follower to move relative to each other and cause the first and second portions to move relative to each other between the open and closed positions.

In another embodiment, a beverage forming system may include a first portion including a lid portion, and a second portion including a cartridge receiving portion. The first and second portions may be movable relative to each other between an open position, in which a beverage cartridge is positionable in the cartridge receiving portion, and a closed position in which the lid and cartridge receiving portion cooperate to at least partially enclose the beverage cartridge. A frame means may be provided for supporting the first and second portions. A linkage means may include first and second members for contacting each other and causing the first and second portions to move between the open and closed positions. Actuator means may be fixed to the first member and move the first member relative to the second member. The second member may be fixed to the frame means, the first portion or the second portion.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
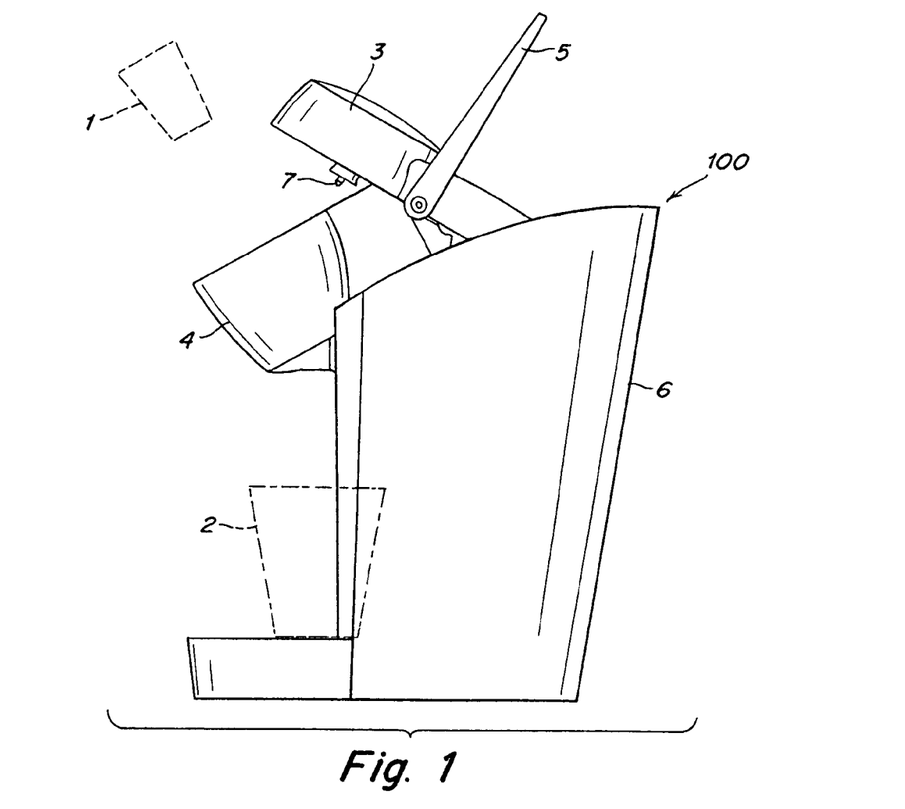
FIG. 1 is a side view of a beverage forming system receiving a beverage cartridge.

FIG. 1 shows a side view of a beverage forming system 100. Although the beverage forming system 100 may be used to form any suitable beverage, such as tea, coffee, other infusion-type beverages, beverages formed from a liquid or powdered concentrate, or other, in this illustrative embodiment, the system 100 is arranged to form coffee or tea beverages. As is known in the art, a beverage cartridge 1 may be provided to the system 100 and used to form a beverage that is deposited into a cup 2 or other suitable container. The cartridge 1 may be manually or automatically placed in a cartridge receiving portion defined by first and second portions 3 and 4 of the beverage forming system 100. For example, the second portion 4 may be or include a cup-shaped or otherwise suitably shaped area in which the cartridge 1 may be placed. Thereafter, a handle 5 or other actuator may be moved in a manual or automatic fashion so as to move the first and second portions 3 and 4 to a closed position, thereby at least partially enclosing the cartridge 1. In this illustrative embodiment, the first and second portions 3 and 4 may be moved relative to each other by rotating the handle 5 in a counterclockwise direction. This motion may cause the second portion 4 to rotate in a clockwise direction and the first portion 3 to rotate in a counterclockwise direction to mate with the second portion 4. However, as discussed below, the first and second portions 3 and 4 may move relative to each other in any suitable way in response to movement of the actuator 5. For example, in some embodiments, the second portion 4 may remain stationary relative to a frame or housing 6 of the system 100 and the first portion 3 may move. Alternatively, the first portion 3 may remain stationary relative to the frame or housing 6 and the second portion 4 may move to bring the first and second portions 3 and 4 to the closed position.

Once the first and second portions are in the closed position, the beverage forming system 100 may use the cartridge 1 to form a beverage. For example, one or more inlet needles 7 associated with the first portion 3 may pierce the cartridge 1 so as to inject heated water or other liquid into the cartridge 1. The injected liquid may form the desired beverage or a beverage precursor. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before entering the container 2. As will be understood by those of skill in the art, cartridges in the form of a pod (e.g., having opposed layers of permeable filter paper encapsulating a beverage medium) may use the outer portion of the cartridge 1 to filter the beverage formed. The second portion 4 may also include one or more outlet needles (see reference 43 in FIG. 2) or other elements to puncture or pierce the cartridge 1 at an outlet side to permit the formed beverage to exit the cartridge 1. Other arrangements are possible however, e.g., the cartridge may have a permeable lower portion, may open upon introduction of liquid under pressure in the cartridge, etc.

Figure 3:
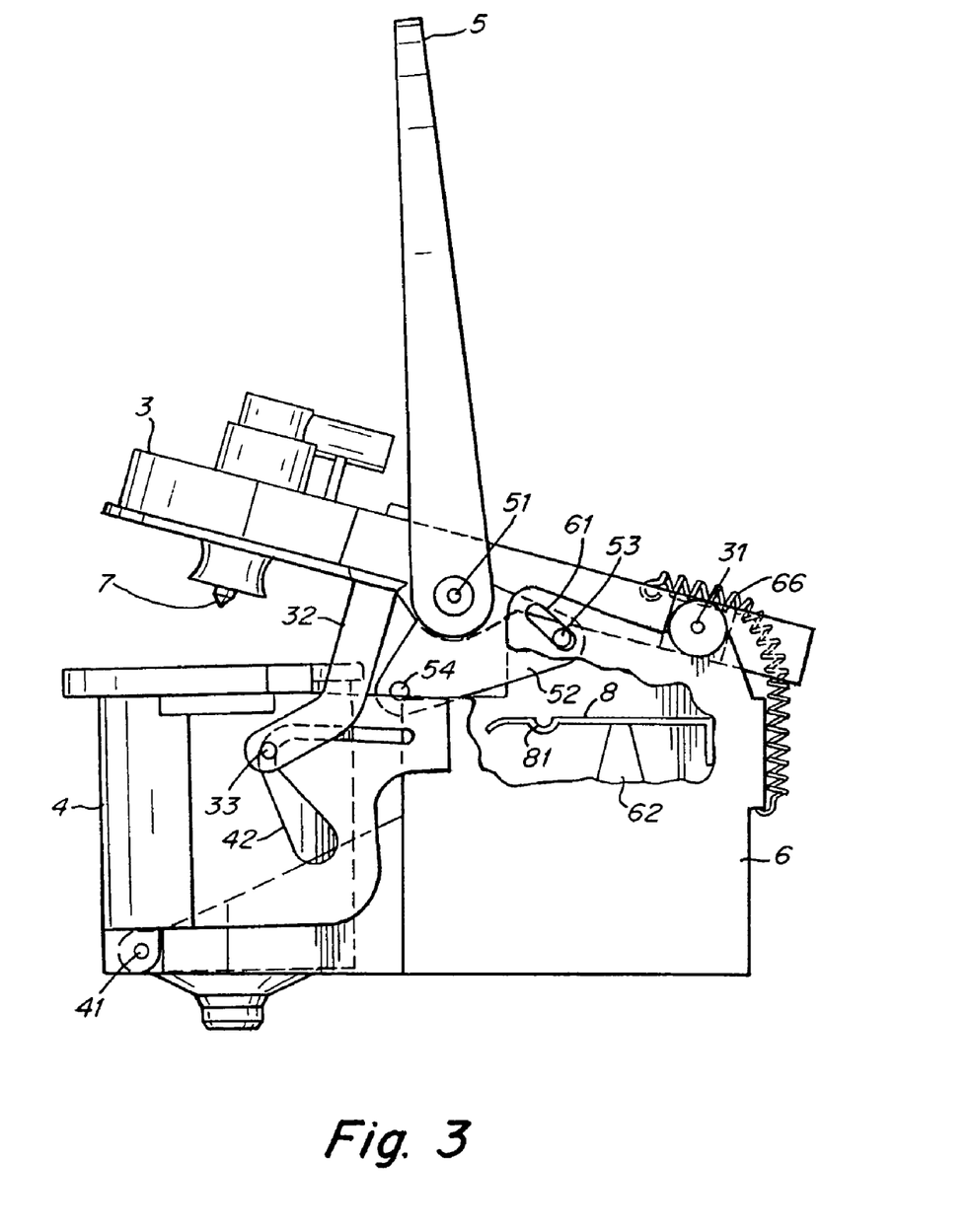
FIG. 3 shows the first and second portions in a partially opened position.
Figure 4:
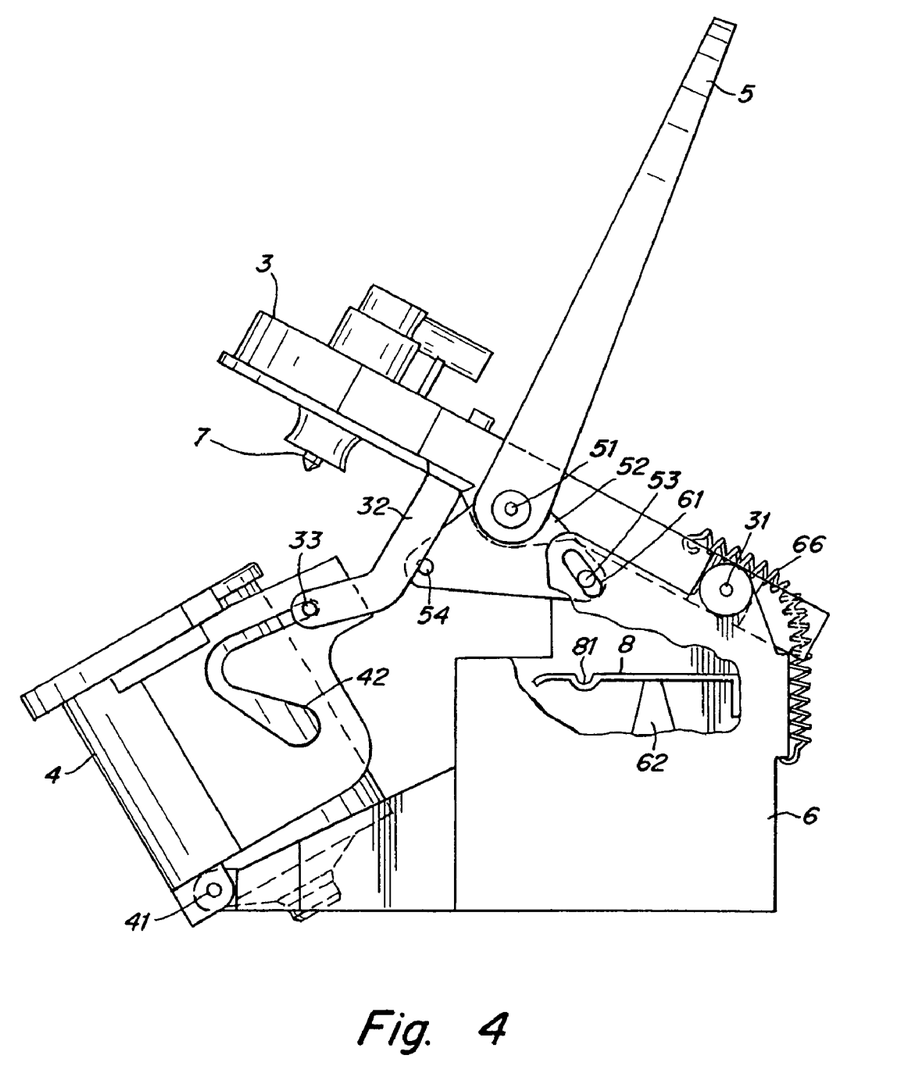
FIG. 4 shows the first and second portions in an open position.

In one aspect of the invention, a first linkage member that is fixed to an actuator, such as a manually-operated handle, motor shaft, pinion gear, etc., may physically contact a second linkage member that is fixed to a frame of the beverage forming system (or to a first or second portion of the system). FIGS. 2-5 show one illustrative embodiment in accordance with this aspect of the invention that may be incorporated into the system 100 shown in FIG. 1. In this embodiment, the first portion 3 is pivotally mounted to the frame 6 at a first pivot 31, and a handle 5 is pivotally mounted to the first portion 3 at a handle pivot 51. A first linkage member 52 is fixed to the handle 5 and includes a cam follower 53 that engages with a cam 61 formed in the frame 6, e.g., a slot, groove or other feature. Accordingly, as the handle 5 is rotated about the handle pivot 51, the first linkage member 52 rotates about the handle pivot 51. Engagement between the cam follower 53 and the cam 61 (which is part of a second linkage member 9 fixed to the frame 6) causes the first portion 3 to rotate about the first pivot 31 relative to the frame 6 and relative to the second portion 4. (A spring 66 fixed at its opposite ends to the first portion 3 and the frame 6 or other suitable member may be included to bias the first portion 3 to move toward the open position.) The arrangement of the cam 61 allows the cam follower 53 to slide relative to the cam 61 as the handle 5 is rotated, as can be seen in FIGS. 3 and 4 which show the handle actuator 5 in an intermediate position between the open and closed positions and in an open position, respectively. Since the first linkage member 52 is fixed relative to the handle actuator 5, the first linkage member 52 may be formed integrally with the handle actuator 5, e.g., may be unitarily molded with the handle actuator 5, separately formed and attached to the handle actuator 5 by welding, adhesive or other fastener, or otherwise engaged with the handle actuator 5. The cam 61 may be formed as part of the frame 6, e.g., may be formed as a feature in a unitarily molded portion of the frame 6 or other member that is fixed to the frame 6. Although in this embodiment the cam 61 includes a straight slot, the cam 61 may be curved, or have any other suitable arrangement.

Figure 2:
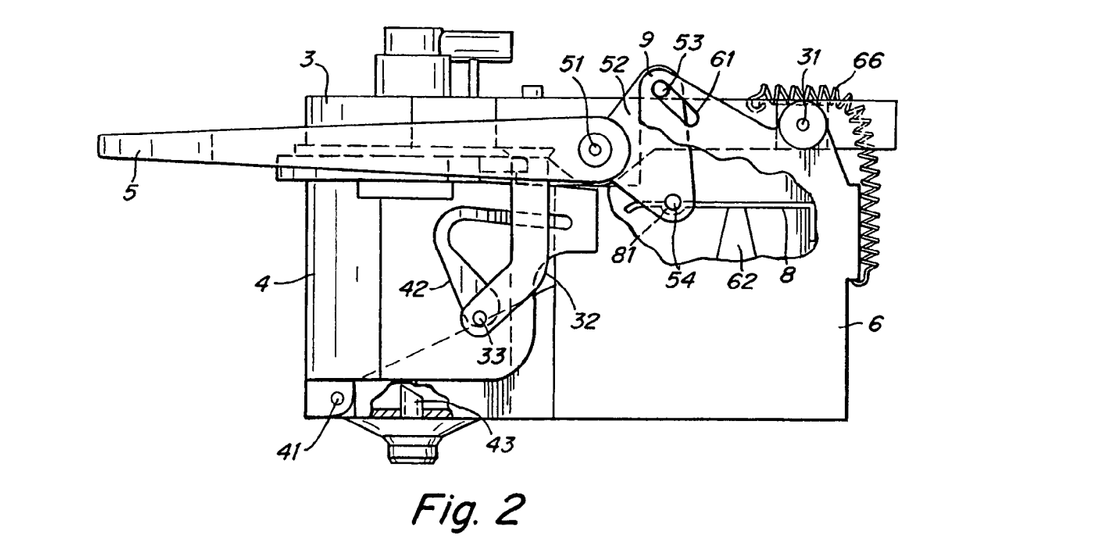
FIG. 2 shows one embodiment of a beverage forming system having first and second portions in a closed position.
Figure 5:
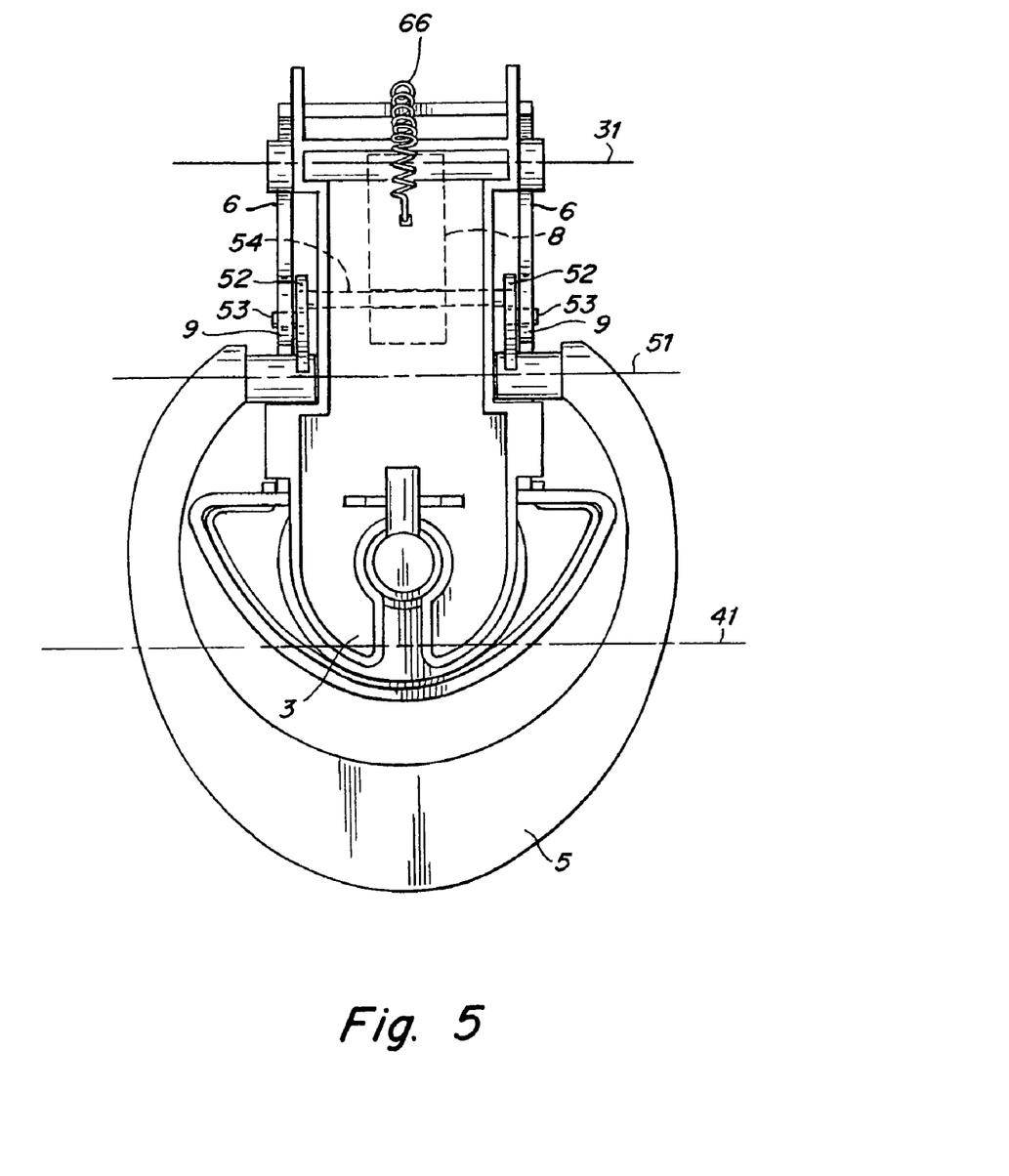
FIG. 5 shows a top view of the arrangement shown in FIGS. 2-4.

FIG. 5 shows a top view of the embodiment shown in FIG. 2. Although a single set of first and second linkage members may be used, in this embodiment, a pair of first and second linkage members are used on opposite sides of the first portion 3. Such an arrangement may help balance the forces involved in causing the first portion 3 to rotate about the first pivot 31 relative to the frame 6. In addition, this embodiment includes a bar 54 that extends between the pair of first linkage members 52. This bar 54 engages with a locking device 8, which in this embodiment includes a plate of spring steel fixed to the frame 6 with a notch 81 that engages with the bar 54 when the handle actuator 5 is in the closed position (see FIGS. 2-4). This engagement provides a detent function such that the handle actuator 5 is locked in the closed position. However, the locking engagement between the bar 54 and locking device 8 may be overcome by suitable force on the handle actuator 5, e.g., by lifting the handle 5 from the closed position. The locking device 8 may include a plate of spring steel that is fixed to the frame 6 and generally extends into free space toward the second portion 4. A portion 62 of the frame may engage with the locking device 8 so as to provide additional support near the distal end of the locking device 8 which carries the notch 81. Thus, as the handle 5 is moved from the open position to the closed position, the bar 54 may initially strike a portion of the locking device 8 that is distal of the notch 81. In response, the locking device 8 may flex downwardly, providing some resistance to movement of the handle 5 toward the closed position. After further movement of the handle actuator 5, the bar 54 may engage with the notch 81, whereupon the distal end of the locking device 8 may spring upwardly to resiliently engage the notch 81 and bar 54.

The locking device 8 shown in FIGS. 2-5 is only one illustrative embodiment to provide a feature of locking the handle 5 in a desired position. It should be understood that various other arrangements may be included to provide a detent-like or other locking feature for the handle actuator 5 in the closed and/or open positions and/or at other positions. For example, one alternate arrangement to the FIG. 2 embodiment is to replace the bar 54 with spherical balls or pins that are attached to the sides of the first linkage member 52. These balls or pins may engage with corresponding depressions formed in a sidewall of the frame 6 such that the balls or pins are received into the depressions in the frame sidewall when the handle actuator 5 is in the closed and/or open position. Resilient engagement of the balls or pins with the sidewall depressions may provide a locking feature for the handle actuator 5, yet allow movement of the handle actuator 5 when desired. In another embodiment, the cam 61 may include a spring-loaded catch or other feature that tends to maintain the cam follower 53 in a desired position relative to the cam 61, e.g., when the handle 5 is in the closed position. The locking device 8 may be arranged to require a user to unlock before movement of the handle 5 is permitted, e.g., require a user to press an unlock button before movement of the handle 5 is permitted. Other arrangements will occur to those of skill in the art.

Another feature shown in the FIGS. 2-4 embodiment is a linkage connected between the first and second portions that is arranged so that movement of the first portion 3 causes movement of the second portion 4 relative to the frame 6. In this illustrative embodiment, the first portion 3 includes an arm 32 with a pin 33 that engages with a groove 42 in the second portion 4. As can be seen in FIGS. 2-4, as the first portion 3 pivots upwardly, engagement of the pin 33 with the groove 42 causes the second portion 4 to pivot about a second pivot 41 relative to the frame 6. As a result, movement of the handle actuator 5 not only causes movement of the first portion 3 relative to the frame 6, but also movement of the second portion 4 relative to the frame 6. It should be understood, however, that movement of the second portion 4 is not required. For example, the second portion 4 may remain stationary relative to the frame 6, e.g., the second portion 4 may be formed integrally with the frame 6. In addition, the second portion 4 may be moved by other means, such as by a user manually moving the second portion 4 or some other arrangement. Similarly, aspects of the invention are not limited to providing movement of the first portion 3. In contrast, the first and second linkage members may be arranged so that movement of the handle actuator 5 causes motion of the second portion 4 rather than the first portion 3, which may remain stationary relative to the frame 6. Whether first portion 3 only, the second portion 4 only, or both portions are movable relative to the frame 6, as used herein, all such motion is referred to as the first and second portions being moved or movable relative to each other.

In addition, it should be understood that the second linkage member 9 need not necessarily be fixed to the frame 6. Instead, the second linkage member 9 may be associated with the first portion 3 and/or the second portion 4. For example, the handle actuator 5 may pivot about a handle pivot 51 that is fixed relative to the frame 6. A cam like the cam slot 61, may be associated with the first or second portions 3 or 4 such that movement of the first linkage member 52 causes the first or second portion 3 or 4 to move relative to the frame 6. Thus, the second linkage member may be fixed to the frame, the first portion or the second portion.

Figure 6:
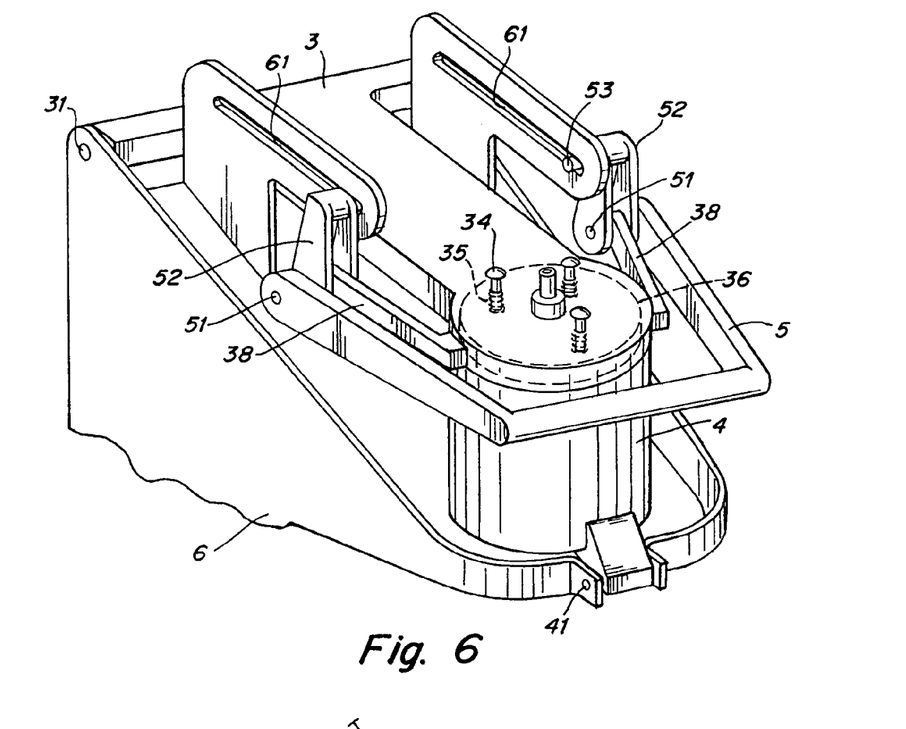
FIG. 6 shows a perspective view of another embodiment in accordance with the invention.
Figure 7:
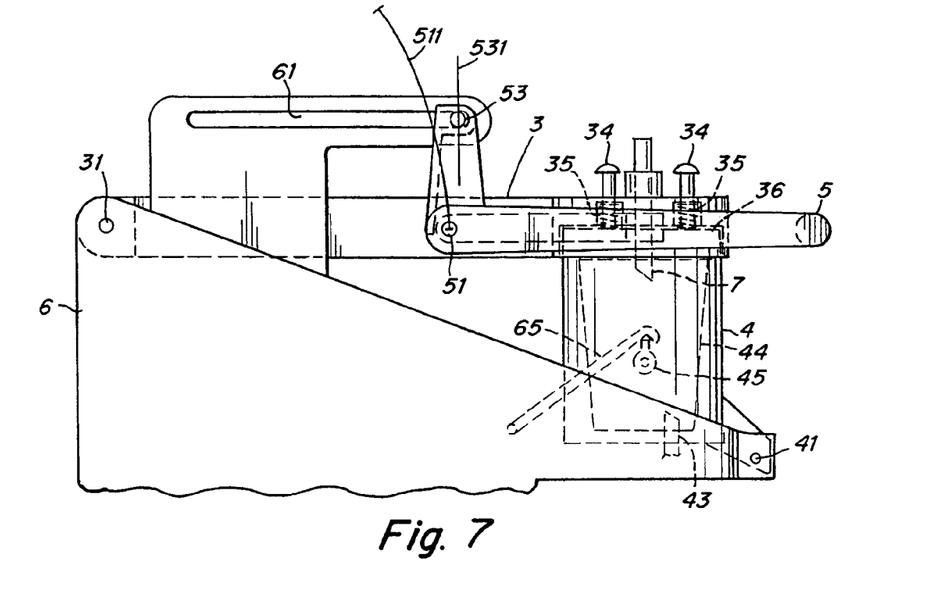
FIG. 7 shows a side view of the FIG. 6 embodiment.

FIGS. 6 and 7 show another embodiment in accordance with aspects of the invention. This embodiment is similar to that shown in FIGS. 2-5 with a difference being how the first and second linkage members interact with each other. Specifically, in this embodiment, a position at which the first linkage member contacts the second linkage member when the handle actuator 5 is in the closed position is farther from a first pivot of the first portion than the handle pivot. As a result, the arrangement provides an "over-center" type locking arrangement for the first portion 3 that resists inadvertent opening of the first portion 3 without movement of the handle. Such an arrangement may be desirable in high pressure environments when a cartridge 1 is injected or otherwise treated with high-pressure liquid or steam to produce a desired beverage.

As shown in FIGS. 6 and 7, this embodiment includes a first portion 3 that is pivotally mounted to a frame 6 at a first pivot 31. A handle actuator 5 is pivotally mounted to arms 38 on the first portion 3 at a handle pivot 51. Thus, the handle actuator 5 may be lifted (e.g., rotated counterclockwise from the position shown in FIG. 7) and rotated about the handle pivot 51 relative to the first portion 3. First linkage members 52 on opposite sides of the handle actuator 5 have respective cam followers 53 (in this embodiment a pin) that engage with a cam 61 that is part of a second linkage member fixed relative to the frame 6. As the handle actuator 5 is lifted, engagement of the cam followers 53 and cams 61 cause the handle pivot 51 to follow the path 511 shown in FIG. 7 and the first portion 3 to rotate about the first pivot 31 (i.e., cause relative movement of the first and second portions 3 and 4). Thus, operation of this embodiment is similar to However, one difference between the embodiments is that when the handle actuator 5 is in the closed position (shown in FIG. 7), the engagement between the cam followers 53 and the cams 61 is arranged so that attempted rotation of the first portion 3 about the first pivot 31 toward the open position without movement of the handle actuator 5 tends to move the handle actuator 5 further toward the closed position (i.e., rotate the handle actuator 5 in a clockwise direction about the handle pivot 51). As a result, the first portion 3 is effectively locked in the closed position when the handle actuator 5 is in its closed position. This locking effect is provided without any additional locking mechanism being provided. In this embodiment, the locking effect is provided because when the handle actuator 5 is in the closed position, a line 531 along which the cam 61 exerts a downward force on the cam follower 53 is located to the right of the handle pivot 51. (Because of the arrangement of the cam 61 and cam follower 53, the line 531 along which the cam 61 exerts force on the follower 53 is perpendicular to the slot walls of the cam 61.) Thus, the force of the cam 61 on the cam follower 53 urges the handle actuator 5 to rotate clockwise, locking the handle 5 and the first portion 3 in place. However, raising of the handle actuator 5 shifts the line of force 531 to the left of the handle pivot 51, allowing the first portion 3 to be moved toward the open position.

Another feature in the FIGS. 6 and 7 embodiment is a spring loaded plate 36 provided on the first portion 3 at the interface between the first portion 3 and the second portion 4. In this embodiment, the plate 36 is biased to move downwardly toward the second portion 4 by springs 35 mounted on guide pins 34 fixed to the plate 36. (Mushroom heads or other suitable features on the tops of the guide pins 34 prevent the plate 36 from disengaging from the first portion 3.) When the first portion 3 is positioned away from the second portion 4, the plate 36 extends below the first portion 3, providing a first point of contact with the second portion 4 (and/or a cartridge 1 in the cartridge receiving portion of the second portion 4) as the first portion 3 is moved to the closed position. (In the downwardly extended position, the plate 36 may also at least partially shield or enclose an inlet needle 7 or other arrangement used to introduce heated water or other liquid into the cartridge 1.) The force of the springs 35 on the plate 36 may be robust enough to force a cartridge 1 into the second portion 4, e.g., to pierce a bottom portion of the cartridge on an outlet needle 43 or other feature. Thereafter, contact of the plate 36 with the second portion 4 may cause the plate 36 to move upwardly relative to the first portion 3 against the force of the springs 35. This resistance to motion provides a upward force on the first portion 3 as the handle actuator 5 is moved to the closed position (and also while the handle actuator 5 is actually at the closed position). The upward force on the first portion 3 causes the user to feel resistance when moving the handle actuator 5 near the closed position, and then sense a slight snap or lock as the force line 531 shifts forward of (to the right in FIG. 7) the handle pivot 51, locking the handle actuator 5 in the closed position. This locking of the handle actuator 5 may be provided by other arrangements, such as a spring member on the frame 6 that exerts an upward force on the first portion 3 at or near the closed position (e.g., like the spring 66), a torsional spring that exerts a moment on the first portion 3 about the first pivot 31, or other.

In the FIGS. 6 and 7 embodiment, the second portion 4 is shown as being rotatable about a second pivot 41 similar to that in the FIGS. 2-5 embodiment. Pivoting of the second portion 4 may be done manually, e.g., by a user first lifting the handle actuator 5 to the open position, and then manually tilting the second portion 4 to a forwardly inclined position (like that shown in FIG. 4) so as to provide easier access to the second portion 4 and its cartridge receiving portion. Alternately, the second portion 4 may be moved by a linkage like that in FIGS. 2-5, or some other suitable arrangement, or may be made fixed relative to the frame 6.

Another feature included in the FIGS. 6 and 7 embodiment is a cartridge ejection function. In this embodiment, the cartridge 1 is ejected as the second portion 4 is tilted forward about the second pivot 41 (whether manually, by a linkage between the first and second portions 3 and 4 or other arrangement). As shown in FIG. 7, the second portion 4 includes a cartridge receiver 44 that is pivotally mounted to the second portion 4 at a cartridge pivot 45. A spring or other suitable element (not shown) normally biases the cartridge receiver 44 to rotate in a clockwise direction to the position shown in FIG. 7. However, when the second portion 4 is tilted forward, a pick 65 that is attached to the frame 6 engages with a tab on the receiver pivot 45, causing the cartridge receiver 44 to rotate rearwardly in a counterclockwise direction relative to the second portion 4 so that the cartridge 1 falls from the receiver 44. Further forward rotation of the second portion 4 causes the pick 65 to disengage from the receiver 44 at the pivot 45, whereupon the receiver 44 rotates (e.g., under the spring bias) in a clockwise direction relative to the second portion 4 to the position shown in FIG. 7. It should be understood that the cartridge ejection function may be provided by other arrangements or may not be provided at all (e.g., requiring a user to manually remove a spent cartridge).

Figure 8:
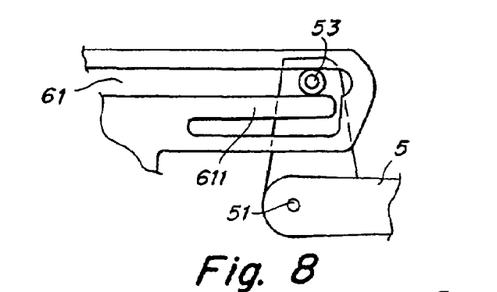
FIG. 8 shows an embodiment of a cam having a movable portion in accordance with one embodiment.

FIG. 8 shows another illustrative embodiment of a modified cam 61 that may provide for a smoother handle movement feel for a user. In this embodiment, the slot of the cam 61 is partially formed by a cantilevered portion 611 at a forward end of the cam 61. The cantilevered portion 611 may flex when the cam follower 53 exerts suitable force downwardly on the cantilevered portion 611, e.g., when the handle 5 is rotated firmly toward the closed position (counterclockwise about the handle pivot 51 as shown in FIG. 8) and/or if the handle 5 is raised quickly to open the first portion 3. Flexing of the cantilevered portion 611 may reduce a "jerky" or "snapping" feel of the handle movement and/or damp motion of the first portion 3 so that the first portion moves more smoothly near the closed position. As also shown in FIG. 8, the cam follower 53 may include a roller element or other feature to reduce friction between the cam follower 53 and the cam 61. In another embodiment, the cantilevered portion 611 may include a dished portion or recess like that in the locking device 8 to catch on the cam follower 53 at a desired point in the cam follower's motion, e.g., with the handle at the closed position. Engagement between the recess and the cam follower 53 may provide a detent or locking feature to retain the handle 5 at one or more desired positions.

Figure 9:
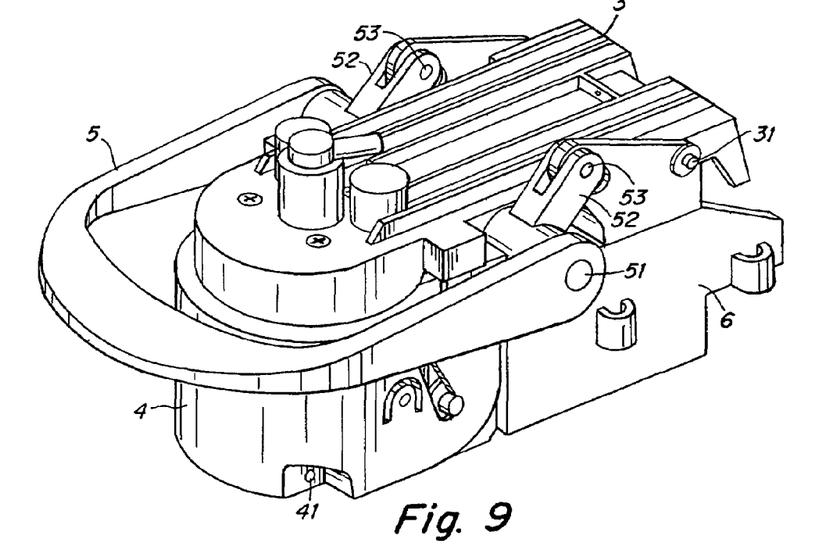
FIG. 9 shows a perspective view of yet another embodiment in accordance with the invention.
Figure 10:
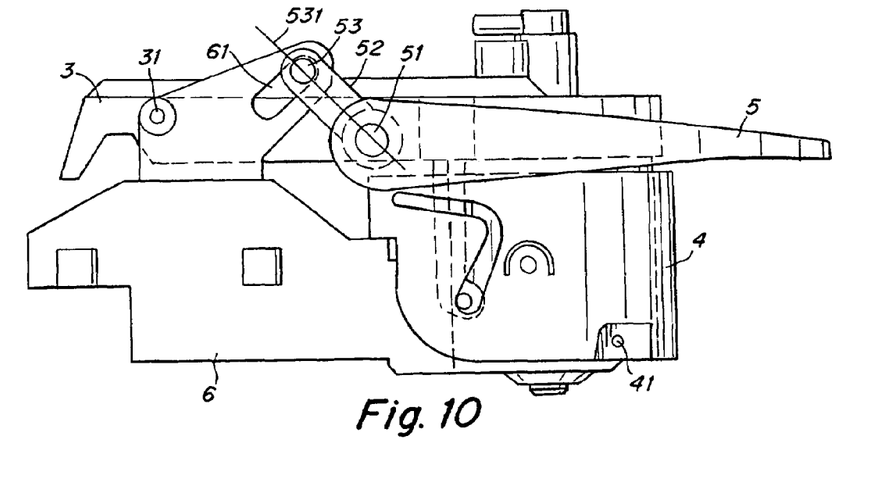
FIG. 10 shows a side view of the FIG. 9 embodiment.

FIGS. 9 and 10 show another embodiment that is similar to the embodiments of FIGS. 2-5 and 6-7, but has a different overcenter locking feature for the handle 5. In this embodiment, the cam 61 is formed in a member (e.g., a second linkage member 9) that is made separately from, and secured to, the frame 6, e.g., the cam 61 is formed in a metal plate that is attached to the frame 6 by one or more fasteners. However, like the FIGS. 2-5 embodiment, the cam 61 and/or the mount for the first pivot 31 could be formed as part of the frame 6 or in any other suitable way. This embodiment has an overcenter-type handle locking feature because the cam 61 and the cam follower 53 are arranged in such a way that a line 531 along which the cam 61 exerts a force on the cam follower 53 (generally downward and to the right as viewed in FIG. 10) is located above and to the right of the handle pivot 51 when the handle 5 is in the closed position. In this particular arrangement, the generally rearwardly sloping arrangement of the cam 61 establishes the line 531 along which the cam 61 exerts force on the cam follower 53, e.g., in a direction perpendicular to the slot walls of the cam 61 if the cam 61 is formed in a straight fashion. Thus, lifting of the first portion 3 from the closed position without moving the handle 5 will cause the cam 61 to urge the cam follower 53 and the attached handle 5 to rotate in a clockwise manner as viewed in FIG. 10. This rotation keeps the handle 5 in the closed position and prevents the first portion 3 from being moved toward the open position unless the handle 5 is lifted. This action is similar to that in the FIGS. 6-7 embodiment, e.g., the first portion 3 can be moved toward the open position once the handle 5 is raised so that the line 531 is shifted below and to the left of the handle pivot 51. Another feature in this embodiment is that each of the first linkage members 52 includes a pair of arms with one arm on either side of the cam 61. The cam follower 53 is formed by a pin extending between the two arms and through the slot of the cam 61. With this arrangement, the handle 5 and first linkage members 52 may be mounted to the first portion 3 by a single rod, if desired.

Although in the embodiments above the handle actuator is pivotally mounted to the first portion and the first portion moves relative to the frame in response to handle movement, other arrangements are envisioned for various aspects of the invention. For example, a motorized actuator may be used, rather than a manually-operated handle. A motorized actuator may cause relative motion of the first and second portions in response to a push-button operation, completion of a beverage formation cycle, or other input or condition. The first and second linkage members are also not limited to engagement via a cam and cam follower. Other arrangements are possible for the first and second linkage members, such as a pair of gears or a rack and pinion engagement (including straight or curved rack configurations). The actuator is not limited to pivotal mounting on the first portion, but rather may be movably mounted to the frame, the first portion and/or second portion for pivoting, sliding and/or other motion. In addition, the first portion need not be made movable relative to the frame. Instead, the first portion may remain stationary relative to the frame, and the second portion may move. It is also possible in some embodiments that there be no frame that supports the first and second portions. Instead, the first and second portions may be linked so as to allow for relative movement without the presence of a third member to provide support for the first and second portions. In the above embodiments, the second (or lower) portion includes a cartridge receiving portion and the first portion includes a lid, but other arrangements in which the first (or upper) portion includes the cartridge receiving portion, or both portions together define a cartridge receiving portion are possible. In addition, the first and second portions need not be arranged with one located above the other. Instead, the first and second portions may be located in a side-by-side or other arrangement relative to each other.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming system comprising:
   first and second portions that define a cartridge receiving portion, at least one of the first and second portions being movable between an open position, in which a beverage cartridge is positionable in the cartridge receiving portion, and a closed position in which the first and second portions cooperate to at least partially enclose the beverage cartridge;
   an actuator movable between first and second positions;
   a frame that supports the first and second portions; and
   first and second linkage members in contact with each other, the first linkage member being fixed relative to the actuator so that movement of the actuator causes movement of the first linkage member relative to the second linkage member, and the second linkage member being fixed relative to the frame, the first portion or the second portion;
   wherein movement of the actuator and first linkage member relative to the second linkage member causes movement of the first and second portions relative to each other between the open and closed positions.

2. The system of claim 1, wherein the actuator includes a handle pivotally mounted to the first portion.

3. The system of claim 1, wherein the first and second linkage members include a cam and cam follower.

4. The system of claim 1, wherein the second linkage member is fixed relative to the frame.

5. The system of claim 1, wherein the first or second portion is fixed relative to the frame.

6. The system of claim 1, wherein the actuator includes a handle, the first linkage member includes a cam follower fixed to the handle, and the second linkage member includes a cam slot fixed relative to the frame.

7. The system of claim 6, wherein the handle is pivotally mounted to the first portion at a handle pivot, the first portion is pivotally mounted to the frame at a first pivot, and rotation of the handle relative to the first portion causes the cam follower to move relative to the cam slot and cause the first portion to pivot relative to the frame.

8. The system of claim 7, further comprising a linkage connected between the first and second portions and arranged so that movement of the first portion causes the linkage to move the second portion relative to the frame.

9. The system of claim 8, wherein the second portion is pivotally mounted to the frame at a second pivot.

10. The system of claim 9, wherein when the handle is in the first position, the first and second portions are in the closed position and a location where the cam follower engages with the cam slot is positioned farther from the first pivot than the handle pivot.

11. The system of claim 7, further comprising a locking device that releasably engages with a portion of the handle when the handle is in the first position.

12. The system of claim 1, wherein the actuator includes a handle pivotally mounted to the first portion at a handle pivot, the first portion is pivotally mounted to the frame at a first pivot, and wherein when the handle is in the first position, the first and second portions are in the closed position and a location where the first linkage member engages with the second linkage member is positioned farther from the first pivot than the handle pivot.

13. The system of claim 1, wherein the first and second portions respectively include at least one piercing member that pierces a beverage cartridge in the cartridge receiving portion when the first and second portions are moved between the open and closed positions.

14. The system of claim 1, wherein the first portion includes a lid and is positioned above the second portion, and wherein the second portion includes the cartridge receiving portion, the lid and cartridge receiving portion cooperating to at least partially enclose a beverage cartridge when the first and second portions are in the closed position.

15. The system of claim 1, further comprising a member between the first and second portions that is biased to move the first and second portions apart.

16. A beverage forming system comprising:
   a first portion including a lid portion;
   a second portion including a cartridge receiving portion, at least one of the first and second portions being movable between an open position, in which a beverage cartridge is positionable in the cartridge receiving portion, and a closed position in which the lid and cartridge receiving portion cooperate to at least partially enclose the beverage cartridge;
   a handle movable between first and second positions;
   a frame that supports the first and second portions;
   a cam and cam follower, one of the cam and cam follower being fixed to the handle so that movement of the handle causes movement of the cam relative to the cam follower, and the other of the cam and cam follower being linked to the frame, the first portion or the second portion so that movement of the cam relative to the cam follower causes movement of the first and second portions relative to each other;

wherein movement of the handle causes the cam and cam follower to move relative to each other and cause the first and second portions to move relative to each other between the open and closed positions.

17. The system of claim 16, wherein the handle is pivotally mounted on the first portion.

18. The system of claim 16, wherein the cam follower is fixed relative to the handle.

19. The system of claim 16, wherein the other of the cam or cam follower is fixed relative to the frame.

20. The system of claim 16, wherein the first and second portions are both movable relative to the frame.

21. The system of claim 16, wherein the cam or cam follower is fixed relative to the first or second portion.

22. The system of claim 16, wherein the cam follower is fixed to the handle and the cam includes a slot fixed relative to the frame.

23. The system of claim 22, wherein the handle is pivotally mounted to the first portion at a handle pivot, the first portion is pivotally mounted to the frame at a first pivot, and rotation of the handle relative to the first portion causes the cam follower to move relative to the slot and cause the first portion to pivot relative to the frame.

24. The system of claim 23, further comprising a linkage connected between the first and second portions and arranged so that movement of the first portion causes the linkage to move the second portion.

25. The system of claim 24, wherein the second portion is pivotally mounted to the frame at a second pivot.

26. The system of claim 25, wherein when the handle is in the first position, the first and second portions are in the closed position and a location where the cam follower engages with the slot is positioned farther from the first pivot than the handle pivot.

27. The system of claim 22, further comprising a locking device that releasably engages with a portion of the handle when the handle is in the first position.

28. The system of claim 16, wherein the handle is pivotally mounted to the first portion at a handle pivot, the first portion is pivotally mounted to the frame at a first pivot, and wherein when the handle is in the first position, the first and second portions are in the closed position and a location where the cam follower engages with the cam is positioned farther from the first pivot than the handle pivot.

29. The system of claim 16, wherein the first and second portions respectively include at least one piercing member that pierces the beverage cartridge when the first and second portions are moved between the open and closed positions.

30. The system of claim 16, wherein the cam and cam follower are arranged to provide an overcenter locking feature for the handle.

31. A beverage forming system comprising:
a first portion including a lid portion;
a second portion including a cartridge receiving portion, the first and second portions being movable relative to each other between an open position, in which a beverage cartridge is positionable in the cartridge receiving portion, and a closed position in which the lid and cartridge receiving portion cooperate to at least partially enclose the beverage cartridge;
a handle pivotally mounted to the first or second portion at a handle pivot and movable between open and closed positions;
a cam and cam follower, one of the cam and cam follower being fixed to the handle so that movement of the handle causes movement of the cam relative to the cam follower, and the other of the cam and cam follower being linked to the first or second portion so that movement of the cam relative to the cam follower causes movement of the first and second portions relative to each other;
wherein movement of the handle causes the first and second portions to move relative to each other between the open and closed positions.

32. A beverage forming system comprising:
a first portion including a lid portion;
a second portion including a cartridge receiving portion, the first and second portions being movable relative to each other between an open position, in which a beverage cartridge is positionable in the cartridge receiving portion, and a closed position in which the lid and cartridge receiving portion cooperate to at least partially enclose the beverage cartridge;
frame means for supporting the first and second portions;
linkage means including first and second members for contacting each other and causing the first and second portions to move between the open and closed positions; and
actuator means fixed to the first member and for moving the first member relative to the second member, the second member being fixed to the frame means, the first portion or the second portion.

33. The system of claim 1, wherein the actuator is movable relative to the first and second portions.

34. The system of claim 32, wherein the actuator means is movable relative to the first and second portions.

* * * * *

UNITED STATES PATENT AND TRADEMARK OFFICE
CERTIFICATE OF CORRECTION

PATENT NO.       : 7,513,192 B2
APPLICATION NO.  : 11/387156
DATED            : April 7, 2009
INVENTOR(S)      : Kevin P. Sullivan et al.

It is certified that error appears in the above-identified patent and that said Letters Patent is hereby corrected as shown below:

Column 6, line 45, after "this embodiment is similar to", add -- that in FIGS. 2-5. --;

line 45, the sentence beginning with "However, one difference..." should be the start of a new paragraph.

Signed and Sealed this

Ninth Day of June, 2009

JOHN DOLL
*Acting Director of the United States Patent and Trademark Office*